United States Patent
Mills

(10) Patent No.: US 7,225,795 B2
(45) Date of Patent: Jun. 5, 2007

(54) SYSTEM AND METHOD FOR CONTROLLING FUEL VAPOR EMISSION IN A SMALL ENGINE

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 180 days.

(21) Appl. No.: 11/088,489

(22) Filed: Mar. 24, 2005

(65) Prior Publication Data

US 2006/0213487 A1   Sep. 28, 2006

(51) Int. Cl.
*F02M 33/02* (2006.01)
(52) U.S. Cl. ........................................ 123/516; 123/519
(58) Field of Classification Search ................ 123/516, 123/518, 519, 520
See application file for complete search history.

(56) References Cited

U.S. PATENT DOCUMENTS

| | | | | |
|---|---|---|---|---|
| 4,974,645 A | * | 12/1990 | Johnson | 141/59 |
| 5,579,802 A | * | 12/1996 | Tuckey | 137/202 |
| 5,687,778 A | * | 11/1997 | Harris | 141/59 |
| 6,000,426 A | * | 12/1999 | Tuckey et al. | 137/588 |
| 6,276,387 B1 | * | 8/2001 | Pachciarz et al. | 137/43 |
| 6,302,137 B1 | * | 10/2001 | Devall | 137/202 |
| 6,655,403 B2 | * | 12/2003 | Mills | 137/2 |
| 2002/0047017 A1 | * | 4/2002 | Goto et al. | 220/562 |
| 2003/0098062 A1 | * | 5/2003 | Engle et al. | 137/202 |
| 2003/0198768 A1 | * | 10/2003 | Delbarre | 428/36.6 |
| 2004/0200846 A1 | * | 10/2004 | Miyajima et al. | 220/562 |
| 2005/0173433 A1 | * | 8/2005 | Spahr | 220/62.22 |
| 2005/0233086 A1 | * | 10/2005 | Chan et al. | 427/402 |

* cited by examiner

*Primary Examiner*—Thomas Moulis
(74) *Attorney, Agent, or Firm*—Anna M. Shih

(57) ABSTRACT

A small engine fuel system has a tank with an integrally formed filler tube having the lower end located at a level below the upper portion of the tank wall which is formed of vapor impermeable material which may include HDPE interspersed with EVOH or polyamide. In one exemplary embodiment the filler neck is disposed in a depression in the upper portion of the tank wall; and in another exemplary embodiment the filler tube has an insert which extends into the tank to a position below the upper portion of the tank wall to form a vapor space. The tank includes a fill limiting vapor vent/tipping valve with its outlet connected to a storage canister which outputs to the engine and which has an atmospheric air vent.

17 Claims, 3 Drawing Sheets

SYSTEM AND METHOD FOR CONTROLLING FUEL VAPOR EMISSION IN A SMALL ENGINE

BACKGROUND

Small engines of less than 50 horsepower (37.4 kilowatts) are widely used in applications such as garden tractors, lawn mowers, portable generating sets and small boat marine applications. Such engines typically employ a fuel tank mounted proximate the engine and arranged for gravity feed of fuel from the tank to the engine carburetor, although in applications approaching 50 horsepower fuel pumps may be employed in certain applications.

Heretofore, small engines have not been subject to fuel vapor emission requirements as are of motor vehicles; however, it has recently been mandated that small engines for such applications to have fuel systems which prevent vapor emission to the atmosphere both during engine operation and during periods of engine shut down. *Fuel tanks for small engines typically employ an open vent in the fuel filler cap for passage of make-up air as fuel is withdrawn during engine operation; and, to prevent pressure build up in the tank from fuel vapor.

The requirement that the tank vent be sealed has caused additional complexity and cost in reworking small engine fuel systems to meet the vapor emission requirements, particularly because engines of this type are manufactured in very high volume and the tooling is of the permanent type and represents a significant expenditure. Requirements for changes in design of the fuel system and fuel tanks will thus result in substantial increase in cost for the engine manufacture. Accordingly, it has been desired to provide a way or means of implementing fuel vapor emission controls to small engines without requiring extensive redesign and retooling of the fuel tank and fuel system components.

Thus it has been desired to minimize the amount of space required for the additional components required to provide the sealed tank system for controlling fuel vapor emission in such small engines.

BRIEF SUMMARY

The present specification, drawings and claims describe a fuel system for a small engine including a fuel tank having an integrally formed, tank and filler tube with a non-venting cap for the filler tube and with the lower end of the filler tube set in the tank at a predetermined level to prevent completely filling the tank above the desired level and thereby providing a vapor dome above the liquid fuel in the tank. The tank includes a fill limiting vapor vent/tipping valve which has its vapor outlet connected to a storage canister which is connected to the engine air inlet for flow of vapor to the engine during operation. An atmosphere air purge vent is provided on the canister and in the described embodiments is connected to the engine filter permitting filtered air to be drawn into the canister during purge flow. The tank is formed with a vapor impermeable barrier which may include material such as HDPE with either ethylene vinyl alcohol (EVOH) interspersed therein, or polyamide interspersed therein. In one embodiment the fuel tank filler extends from a depressed area in the top of the tank wall such that the lower end of the filler tube is at a level lower than the top of the tank to thereby define a vapor dome. In an alternative embodiment the lower end of the filler tube is defined by an insert in the integrally molded filler tube with the lower end of the insert defining the desired fuel fill level.

DETAILED DESCRIPTION

Figure 1:
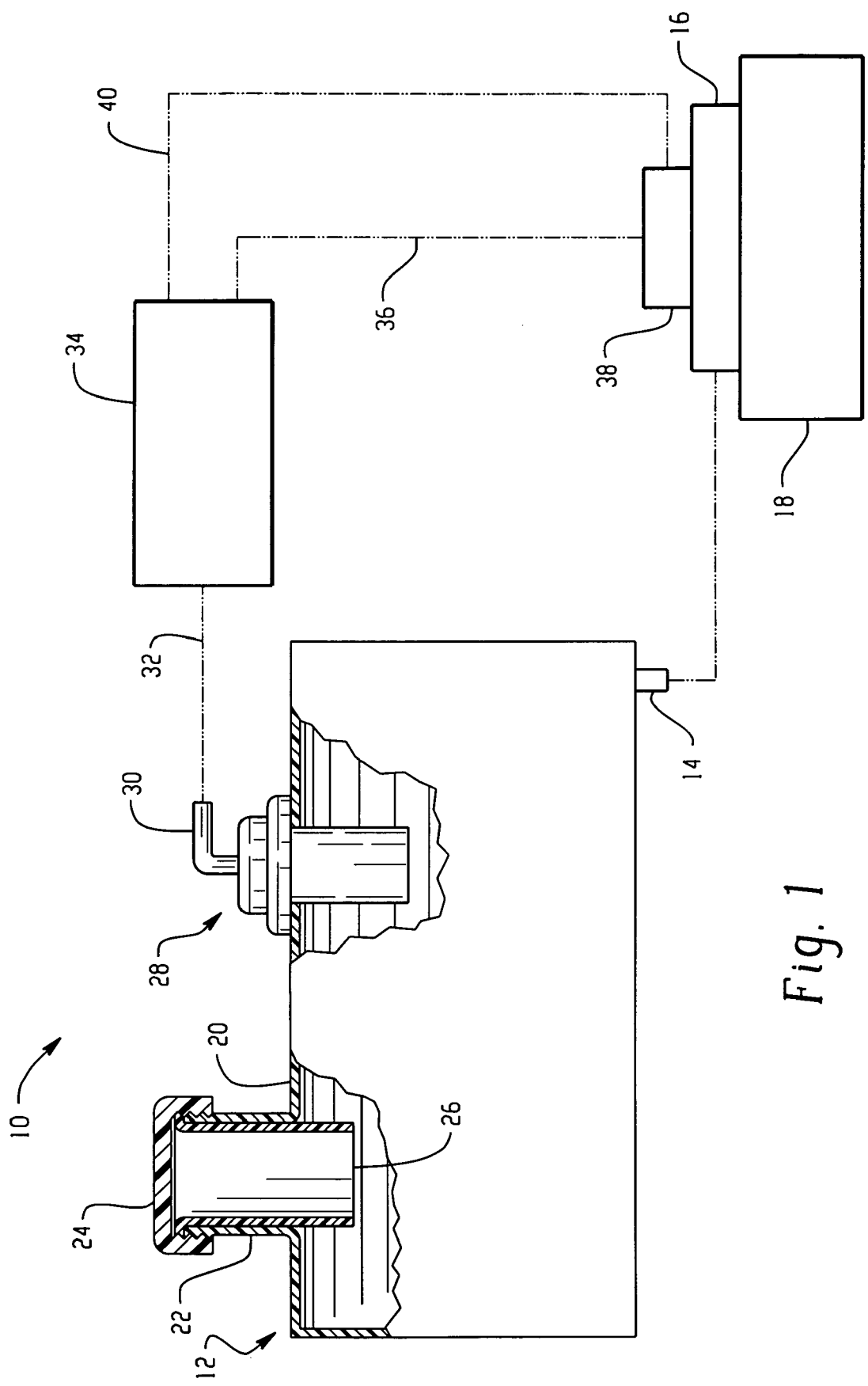
FIG. 1 is a pictorial schematic of the fuel vapor system for a small engine.

Referring to FIG. 1, a system for controlling fuel vapor emission in a small engine is indicated generally at 10 and includes an exemplary embodiment of a fuel tank indicated generally at 12 having a gravity feed fuel line 14 connected to the carburetor 16 of a small engine 18. The upper portion of the wall structure 20 of the tank has formed integrally therewith a fuel filler tube 22 which has a non-vented user removable closure cap 24 disposed on the upper end thereof. The lower end 26 of the filler tube extends inwardly of the tank to a predetermined desired level for reasons which will hereinafter be described in greater detail.

The upper wall structure 20 of the tank also has disposed therein a fill limiting vapor vent/tipping valve indicated generally at 28 which has a vapor vent outlet 30 which is connected along line 32 to a storage canister 34 which may contain adsorbent material. The storage canister 34 has a purge or vapor outlet connected along line 36 through a filter 38 provided in the air inlet of engine 18. The storage canister 34 also has an atmospheric air vent which may be filtered as for example by connection along line 40 to the air filter 38 of the engine.

The fill limiting vapor vent/tipping valve 28 may be of the type which is float operated to close the vent outlet 30 when the fuel level in the tank reaches a predetermined level. The valve may also include a function which closes the valve when the tank is disoriented to a predetermined level of tipping or upon inversion or rollover.

Figure 2:
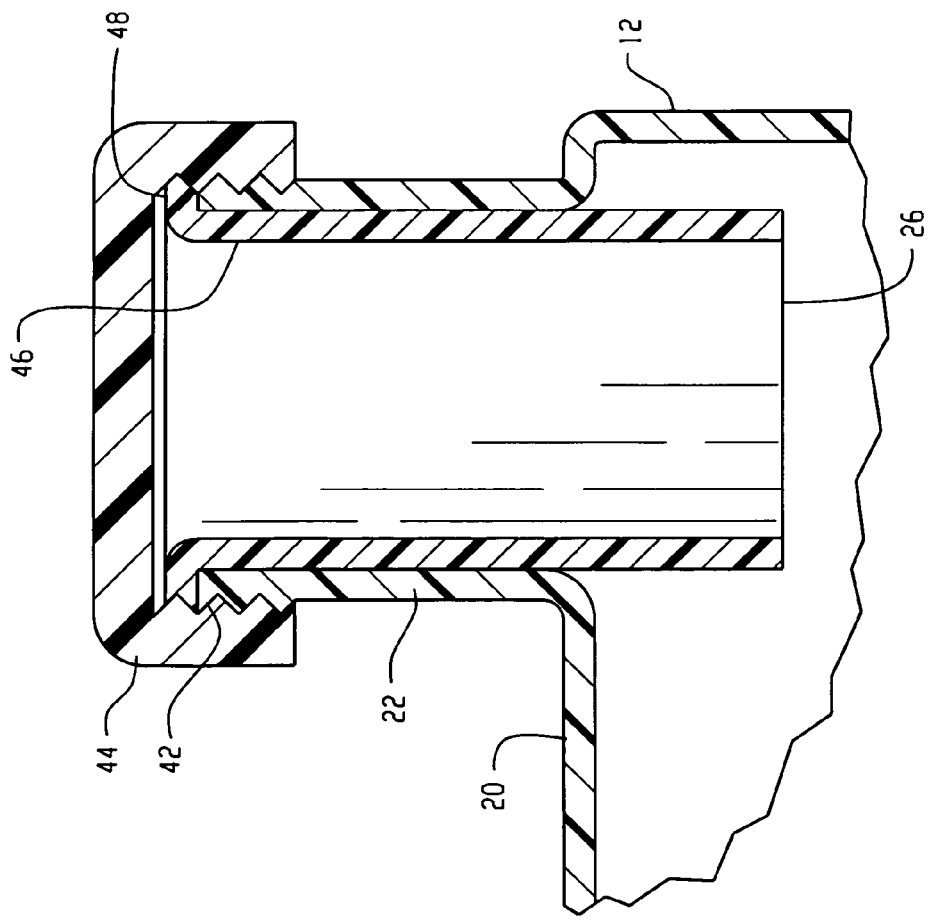
FIG. 2 is a portion of a section view showing an alternative embodiment of the fuel filler of the tank of FIG. 3.

Referring to FIG. 2, the upper portion of the tank wall structure 20 has formed integrally therewith as one piece, the vertically rising filler tube 22 which has the upper end thereof provided with threads 42 upon which a cap 44 is threadingly engaged for closing the filler tube; and, the cap is user-removable for refueling.

In the embodiment of FIGS. 1 and 2, the lower end of the filler tube 26 is formed by an insert 46 which has an outwardly extending annular flange 48 formed thereon and which may be secured to the filler tube 22 by any suitable expedient as for example weldment or adhesive bonding.

As mentioned hereinabove, the lower end 26 of the filler tube is located at a predetermined level in the tank. Upon user removal of the cap 44 and upon refueling, as the level of fuel in the tank to cover the lower end 26 of the filler tube, continued refueling causes the fuel to rise rapidly within the insert 46. When the fuel level reaches the lower end 26 of the filler tube and begins to rise toward the upper end of the insert 46, it provides a visual signal to the user that the tank has filled to the desired level. This arrangement prevents the fuel from rising significantly above the level 26 of the lower end of the insert; and, thus a vapor space is retained in the tank above the level of the liquid fuel and below the upper portion of the wall 20 of the tank.

The lower end 26 of the filler tube insert is positioned in the tank such that the valve 28 remains open when the fuel level reaches the end 26; and, upon reclosure of cap 44 fuel vapor may escape through valve 28 to the storage canister 34 and pressure build up within the tank is prevented.

In the present practice, the fuel tank 12 may be formed by any cost effective technique such as by blow molding of material which is substantially impervious to fuel vapor, as for example, high density polyethylene (HDPE) interspersed with ethylene vinyl alcohol (EVOH) material or HDPE interspersed with polyamide material. However it will be understood that other suitable vapor impervious materials may be used.

Figure 4:
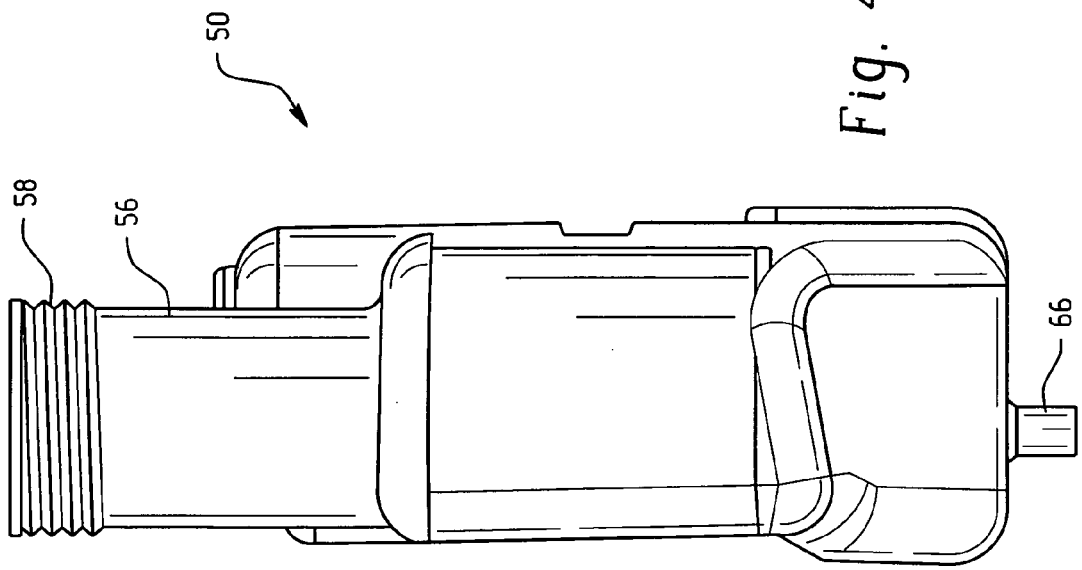
FIG. 4 is a left end view of the tank of FIG. 3.
Figure 3:
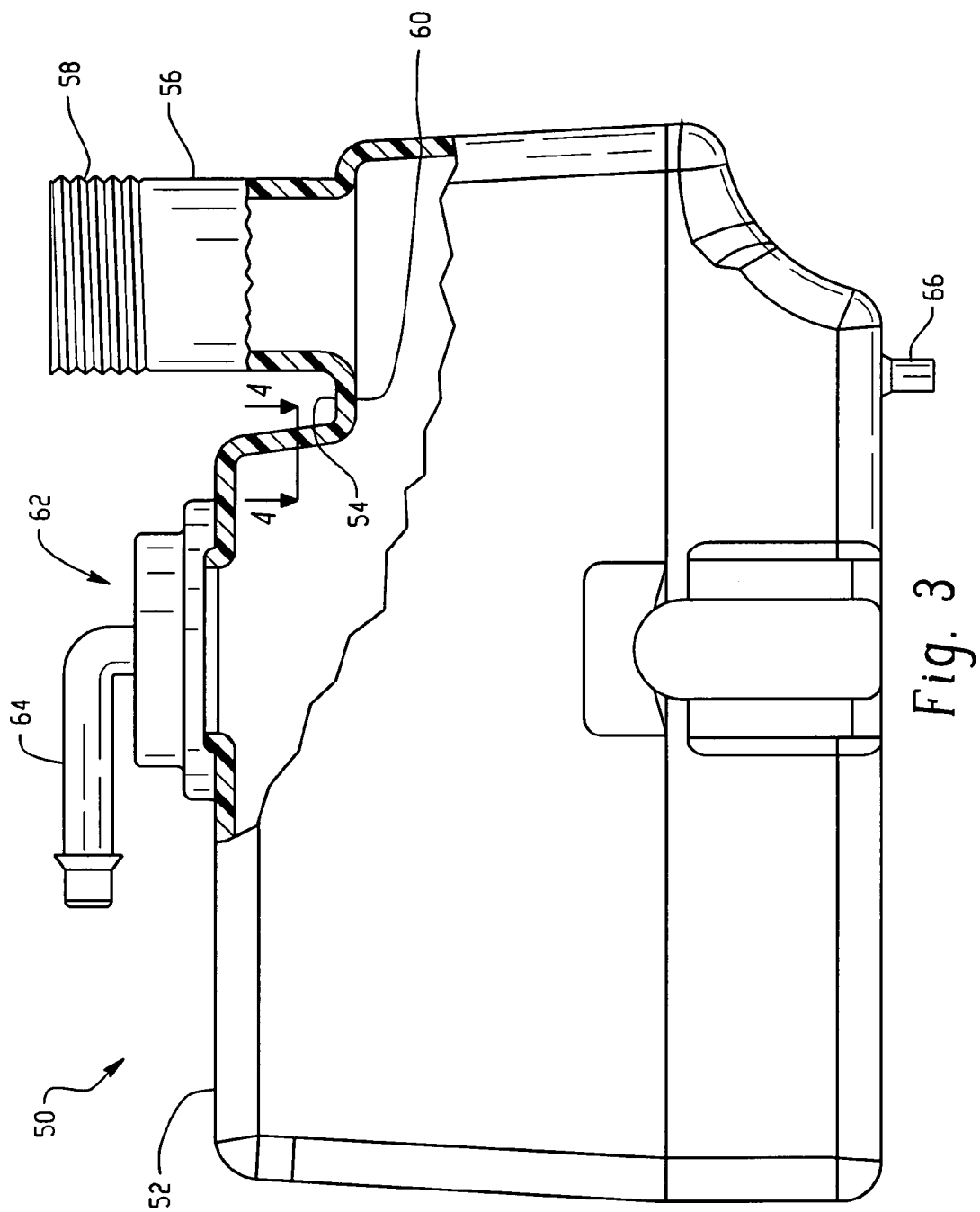
FIG. 3 is a side view of a fuel tank for the system of FIG. 1.

Referring to FIGS. 3 and 4, an alternative exemplary embodiment of the fuel tank is indicated generally at 50 wherein the upper portion of the tank wall 52 has a depression or lower level 54 formed therein which may be formed adjacent one end of the tank. A vertically rising filler tube 56 is formed integrally therewith as one piece; and, tube 56 has threads 58 provided on the upper end thereof. It will be understood that the threads 58 may engage a suitable closed filler cap (not shown) in FIGS. 3 and 4.

The lower end of the filler tube 56 opening into the tank is denoted by reference number 60 and is disposed at a predetermined level below the upper portion of wall 52 of the tank and provides for rapid rising of fuel in the filler tube, upon the fuel level reaching the lower end 60; and, end 60 thus functions in the same manner as the lower end 26 described above with respect to the embodiments of FIGS. 1 and 2.

Tank 50 includes a fill limiting vapor vent/tipping valve indicated generally at 62 which has an outlet 64 adapted for connection to the storage canister 34. Tank 50 also has a gravity feed fuel outlet 66 which may be connected to the engine carburetor 16.

In the embodiment of FIGS. 3 and 4, the valve 62 functions to close in the event of disorientation of the tank to a predetermined degree of tipping or rollover. When the tank 50 is upright, valve 62 remains open so long as there is a vapor space below the upper portion 52 of the tank wall and the lower 60 of the filler tube and permits fuel vapor to flow to the storage canister.

The embodiments described herein with respect to the illustrated embodiments provide for fuel vapor emission control in a small engine without requiring substantial increase in the space required for the fuel system and provides the necessary vapor space above the liquid fuel level in the tank to permit the filler cap to be sealed and yet provide for vapor flow to a storage canister, atmospheric venting and prevents pressure build up within the tank.

It will be understood that modifications and variations may be made with respect to the embodiments shown and described herein within scope of the following claims.

The invention claimed is:

1. A fuel vapor emission control system for a portable appliance having a small engine comprising:
   (a) fuel tank with a fuel vapor impervious barrier in the wall thereof and having a portion of the upper wall forming a vapor dome;
   (b) a filler tube formed integrally with the wall structure of the tank with the end of the filler tube in the tank disposed at a level lower than the vapor dome such that during refueling fuel rises in said filler tube before the vapor dome, wherein the rising fuel in the filler tube provides a visual indication of a desired fuel level in the fuel tank;
   (c) an overfill limiting vapor vent/tipping valve with a vapor vent outlet disposed through the wall of said vapor dome; and
   (d) a conduit connecting said vapor vent outlet to the air inlet of the engine.

2. The system defined in claim 1, wherein said conduit includes a vapor storage canister.

3. The system defined in claim 1, wherein said vapor vent/tipping valve includes a float operator.

4. The system defined in claim 1, wherein said tank has said portion of the upper wall thereof configured to locate the lower end of the filler tube at said lower level.

5. The system defined in claim 1, wherein said filler tube includes an insert extending into the tank and including said end at said lower level.

6. The system defined in claim 5, wherein said valve is float operated and extends to a level preventing said float from closing said valve during refueling.

7. The system defined in claim 1, wherein said conduit includes a storage canister with an atmospheric air purge vent.

8. The system defined in claim 1, wherein said atmospheric purge vent is connected to an air filter on the engine air inlet.

9. The system defined in claim 1, wherein said barrier is formed essentially of ethylene vinyl alcohol material.

10. A method of controlling fuel vapor emission in a small engine fuel system for a sortable appliance, comprising
   (a) forming a fuel tank wall structure with a vapor barrier therein and integral filler tube;
   (b) disposing the lower end of the filler tube at a predetermined level lower than the upper most portion of the tank wall structure; and,
   (c) disposing an overfill limiting vapor vent/tipping valve in the said uppermost portion of the tank wall structure; and,
   (d) connecting a vapor outlet of said valve to the air inlet of the engine; and,
   (e) limiting the filling level during refueling to the level of the lower end of said filler tube, wherein the filler tube provides a visual indication of the fuel reaching the predetermined level.

11. The system defined in claim 1, wherein said tank and an filler tube are blow molded.

12. The method defined in claim 10, wherein said step of forming a tank includes forming a barrier essentially of ethylene vinyl alcohol material.

13. The method defined in claim 10, where said step of forming a tank wall structure with integral filler tube includes disposing an insert in the filler tube and forming the lower end with said insert.

14. The method defined in claim 10, wherein said step of disposing the lower end of the filler tube includes forming a depression in the upper portion of the tank wall and locating the filler tube in the depression.

15. The method defined in claim 10, wherein the step of forming a depression includes locating the depression at an edge of the tank.

16. The method defined in claim 10, wherein the step of disposing the valve includes disposing a float operated valve.

17. The method defined in claim 10 wherein said step of forming a fuel tank wall structure includes forming a barrier of essentially polyamide.

* * * * *